United States Patent
Chi et al.

(10) Patent No.: US 11,709,304 B2
(45) Date of Patent: Jul. 25, 2023

(54) LIGHT SOURCE MODULE AND DISPLAY DEVICE

(71) Applicant: E Ink Holdings Inc., Hsinchu (TW)

(72) Inventors: Jen-Yuan Chi, Hsinchu (TW); Yu-Nan Pao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/694,629

(22) Filed: Mar. 14, 2022

(65) Prior Publication Data
US 2022/0390793 A1    Dec. 8, 2022

(30) Foreign Application Priority Data

Jun. 3, 2021 (TW) ................... 110120193

(51) Int. Cl.
*F21V 8/00* (2006.01)
*G02F 1/1335* (2006.01)
*G02F 1/13357* (2006.01)

(52) U.S. Cl.
CPC ........... *G02B 6/0026* (2013.01); *G02B 6/005* (2013.01); *G02F 1/1336* (2013.01); *G02F 1/133514* (2013.01); *G02F 2202/36* (2013.01)

(58) Field of Classification Search
None
See application file for complete search history.

(56) References Cited

U.S. PATENT DOCUMENTS

| | | |
|---|---|---|
| 8,520,301 B2 | 8/2013 | Lin et al. |
| 10,007,039 B2 | 6/2018 | Aube |
| 10,295,721 B1 | 5/2019 | Marason et al. |
| 10,330,850 B2 | 6/2019 | Kim et al. |
| 10,852,461 B2 | 12/2020 | Schmeder et al. |
| 2007/0036186 A1* | 2/2007 | Corzine ................. B82Y 20/00 372/50.11 |

(Continued)

FOREIGN PATENT DOCUMENTS

| | | | |
|---|---|---|---|
| CN | 105093662 A | * 11/2015 | ....... G02F 1/133514 |
| TW | 200940905 | 10/2009 | |

OTHER PUBLICATIONS

"Office Action of Taiwan Counterpart Application", dated May 25, 2022, p. 1-p. 5.

*Primary Examiner* — Shan Liu
(74) *Attorney, Agent, or Firm* — JCIPRNET

(57) ABSTRACT

A light source module and a display device are provided. The light source module includes a light-emitting element, a light-guiding plate, and a filter. The light-emitting element includes a light-emitting surface. The light-guiding plate includes a light-incident surface, and the light guide plate is disposed such that the light-incident surface faces the light-emitting surface. The filter is disposed between the light-emitting surface and the light-incident surface, and a center wavelength of a reflection band of the filter falls in a range of 570 nm to 590 nm. The light-emitting element emits a first light having a first color temperature from the light-emitting surface. The first light is filtered into the second light having a second color temperature after it passes through the filter. The light-incident surface of the light-guiding plate receives the second light. The first color temperature is lower than the second color temperature.

12 Claims, 5 Drawing Sheets

(56) References Cited

U.S. PATENT DOCUMENTS

| 2012/0057098 A1* | 3/2012 | Lin .................. G02F 1/133621 |
| | | 349/62 |
| 2013/0235303 A1* | 9/2013 | Van De Ven ............. F21K 9/68 |
| | | 257/89 |
| 2019/0203112 A1* | 7/2019 | Köseoglu .............. H01L 33/501 |
| 2021/0223632 A1* | 7/2021 | Yang ................ G02F 1/133616 |

\* cited by examiner

LIGHT SOURCE MODULE AND DISPLAY DEVICE

CROSS-REFERENCE TO RELATED APPLICATION

This application claims the priority benefit of Taiwan application serial no. 110120193, filed on Jun. 3, 2021. The entirety of the above-mentioned patent application is hereby incorporated by reference herein and made a part of this specification.

BACKGROUND

Technical Field

This disclosure relates to an optical module and device, and in particular to a light source module and display device.

Description of Related Art

A light source module is widely used in display devices, and a light-emitting element applied to the light source module is mainly a light-emitting diode (LED). In general, in order to increase color saturation of the light source module, a hybrid LED is used as the light-emitting element, for example, a blue light-emitting diode with green and red phosphors to increase the color saturation of the light source module. However, its color gamut based on the NTSC (National Television System Committee) standard is narrow. If a red/blue/green three-color light-emitting diode is used as the light-emitting element, its efficiency is poor and chromatic aberration is likely to occur due to different attenuation rates of the different light-emitting diodes. Therefore, how to enable the light source module to have better color saturation and a wider NTSC color gamut concurrently remains a challenge for those skilled in the art.

SUMMARY

This disclosure provides a light source module and a display device, which have better color saturation and a wider NTSC color gamut.

The light source module of the disclosure includes a light-emitting element, a light-guiding plate, and a filter. The light-emitting element includes a light-emitting surface, the light-guiding plate includes a light-incident surface, and the light-guiding plate is disposed such that the light-incident surface faces the light-emitting surface. The filter is disposed between the light-emitting surface and the light-incident surface, and a center wavelength of a reflection band of the filter falls in a range of 570 nm to 590 nm. The light-emitting element emits a first light having a first color temperature from the light-emitting surface. The first light is filtered into the second light having a second color temperature after it passes through the filter. The light-incident surface of the light-guiding plate receives the second light. The first color temperature is lower than the second color temperature.

In an embodiment of the disclosure, the first color temperature is between 2500 K and 3800 K.

In an embodiment of the disclosure, the second color temperature is between 6000 K and 7000 K.

In an embodiment of the disclosure, the filter includes a base and a stacked structure disposed on the base. The stacked structure includes alternately stacked (N+1) first material layers and N second material layers, where N is a positive integer. Each of the second material layers is sandwiched between two of the first material layers. The first material layer has a first refractive index, the second material layer has a second refractive index, and the first refractive index is greater than the second refractive index.

In an embodiment of the disclosure, a ratio of a difference between the first refractive index and the second refractive index to a number of layers of the stacked structure is between 0.049 and 0.277.

In an embodiment of the disclosure, a material of the first material layer includes titanium dioxide, and a material of the second material layer includes silicon dioxide.

In an embodiment of the disclosure, in which N is at least 3.

In an embodiment of the disclosure, a thickness of each of the first material layers is $3(\lambda_0/4n_1)$ or $5(\lambda_0/4n_1)$, and a thickness of each of the second material layers is $3(\lambda_0/4n_2)$ or $5(\lambda_0/4n_2)$, where $\lambda_0$ is the center wavelength of the reflection band of the filter, $n_1$ is the first refractive index, and $n_2$ is the second refractive index.

In an embodiment of the disclosure, a width range of the reflection band is from 20 nm to 120 nm.

In an embodiment of the disclosure, the light-emitting element includes silicate or yellow phosphor.

The display device of the disclosure includes the light source module and a display module. The display module is located under the light-guiding plate of the light source module.

In an embodiment of the disclosure, the display module is a reflective display module.

In an embodiment of the disclosure, the light source module is a former light source module.

In an embodiment of the disclosure, the display module is bonded to the light-guiding plate of the light source module through an adhesive material.

Based on the above, the light source module of the disclosure includes the filter disposed between the light-emitting surface and the light-incident surface, and the center wavelength of the reflection band of the filter falls in the range of 570 nm to 590 nm, which may enable the first light having the lower color temperature to be filtered into the second light having the higher color temperature by the filter, thereby obtaining a wider NTSC color gamut, and improving the color saturation of the display device.

To make the above features and advantages more comprehensible, several embodiments accompanied by drawings are described in detail as follows.

DESCRIPTION OF THE EMBODIMENTS

Figure 1:
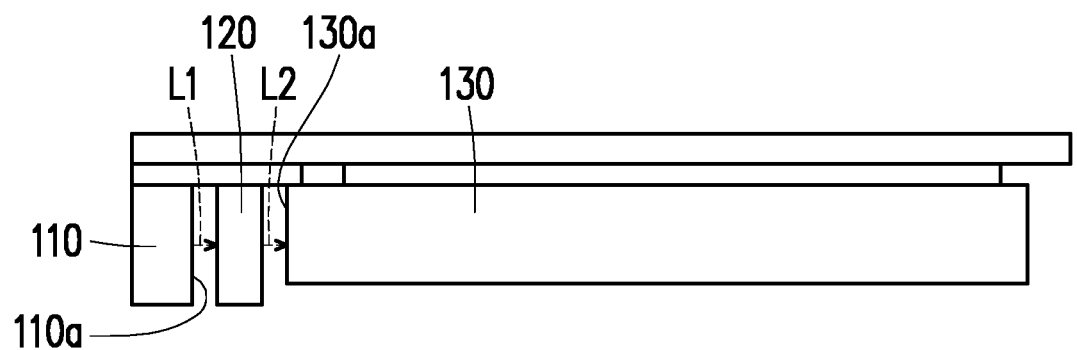
FIG. 1 is a schematic cross-sectional view of a light source module according to an embodiment of the disclosure.

Directional terms mentioned in this text, such as "up", "down", "front", "back", "left", "right", are only directions with reference to the drawings. Therefore, the directional terms used are for illustrative purposes, and are not intended to limit the disclosure.

In the drawings, each drawing depicts the general features of the methods, structures, and/or materials used in a specific embodiment. However, the drawings should not be construed as defining or limiting the scope or nature covered by the embodiments. For example, the relative size, thickness, and position of each layer, region, and/or structure may be reduced or enlarged for clarity.

In the following embodiments, the same or similar elements use the same or similar reference numerals, and redundant descriptions are omitted. In addition, the features in the different embodiments may be combined without conflict, and simple equivalent changes and modifications made in accordance with this specification or the scope of the patent application still fall within the scope of this patent.

Terms such as "first" and "second" mentioned in the specification or the scope of the patent application are only intended to name discrete elements or to distinguish between different embodiments or ranges, and are not intended to limit an upper limit or a lower limit of the number of elements, and are also not intended to limit a manufacturing order, or a disposition order of the elements. In addition, disposition of one element/film layer on (or above) another element/film layer may encompass the element/film layer being directly disposed on (or above) the other element/film layer, and the two elements/film layers are in direct contact with each other, and the element/film layer being indirectly disposed on (or above) the other element/film layer, and there are one or more elements/film layers between the two elements/film layers.

Figure 2:
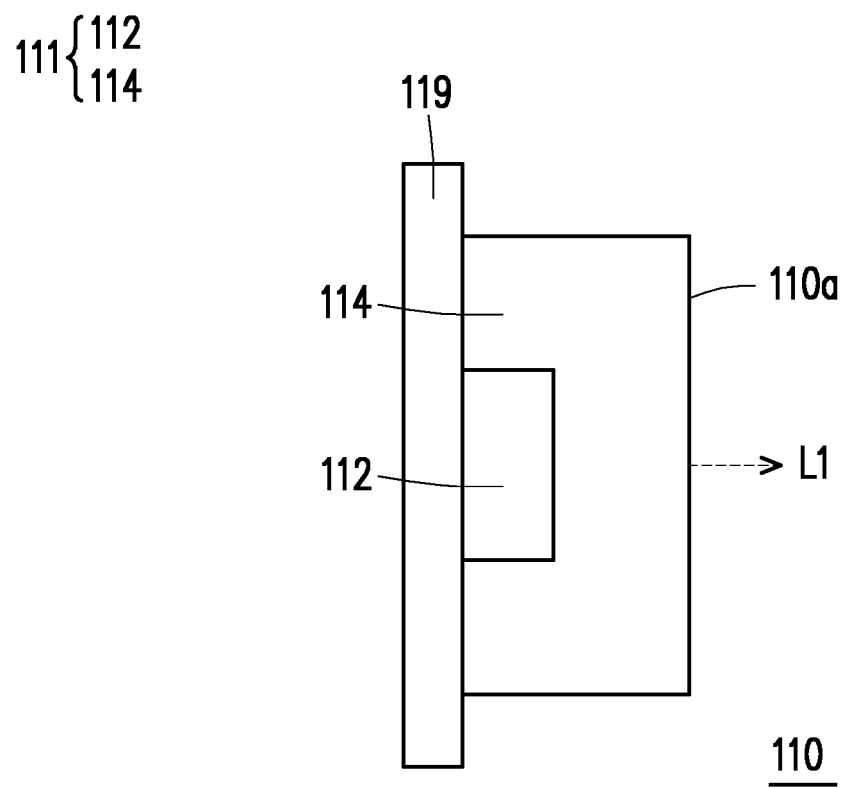
FIG. 2 is a schematic cross-sectional view of a light-emitting element in a display device in FIG. 1.
Figure 3:
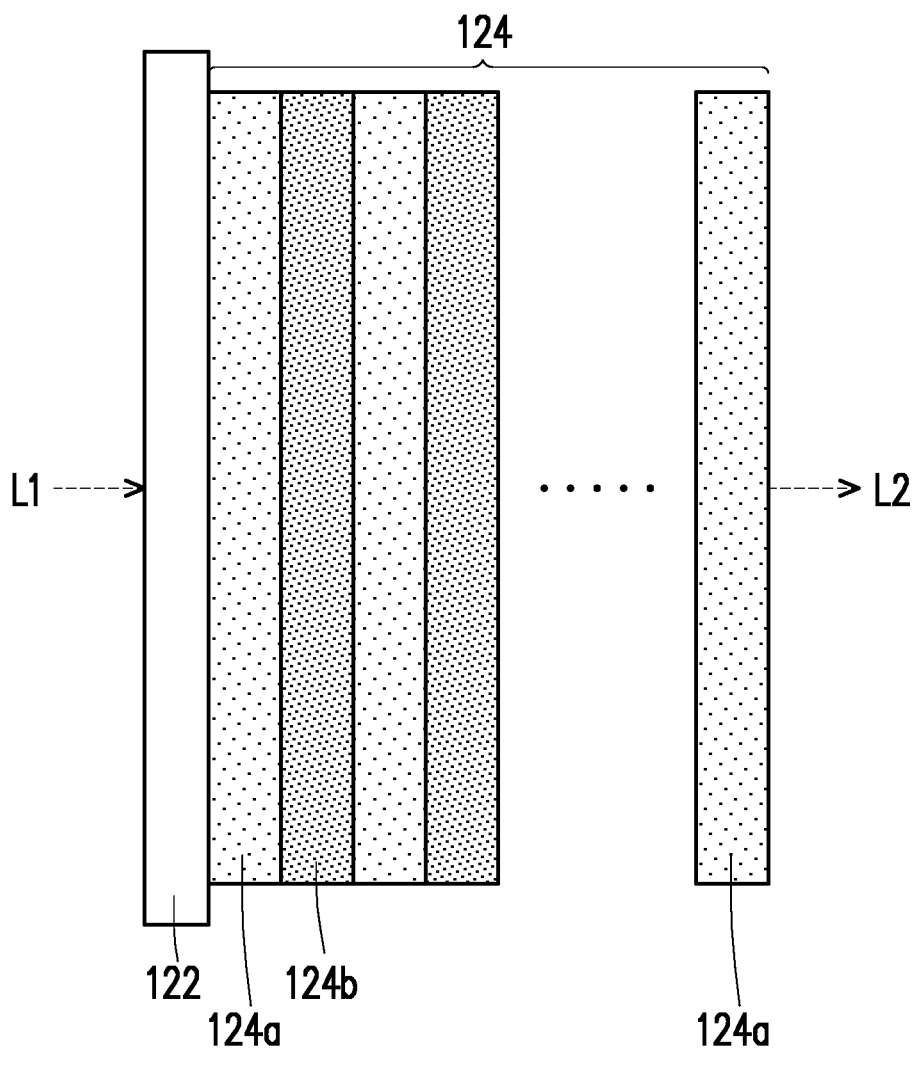
FIG. 3 is a schematic cross-sectional view of a filter in the display device in FIG. 1.
Figure 4:
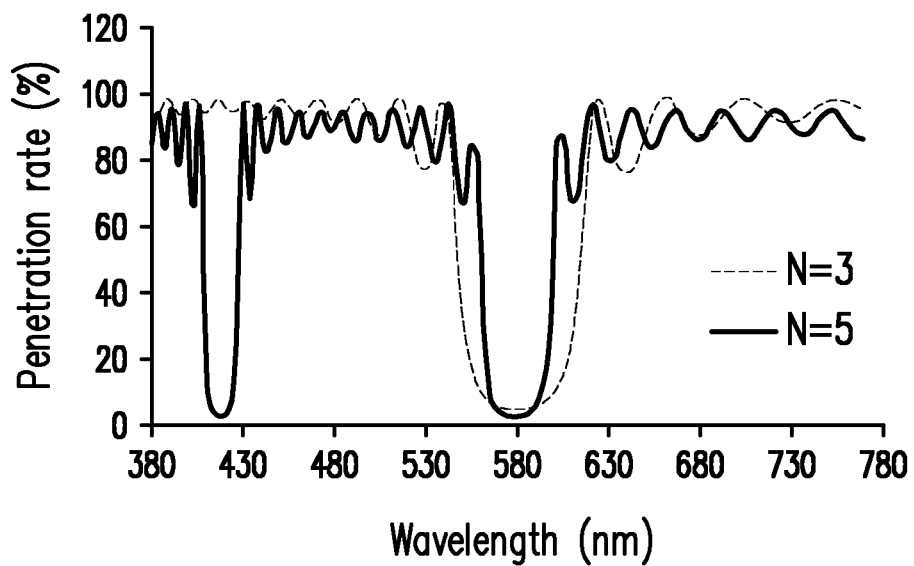
FIG. 4 is a reflection spectrogram of the filter according to an embodiment of the disclosure.
Figure 5:
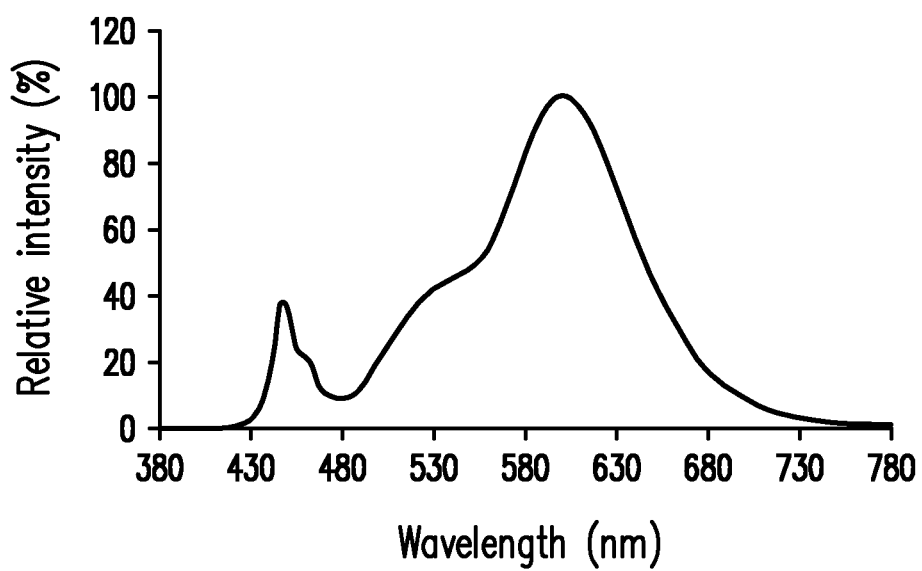
FIG. 5 is a spectrogram of a first light according to an embodiment of the disclosure.
Figure 6:
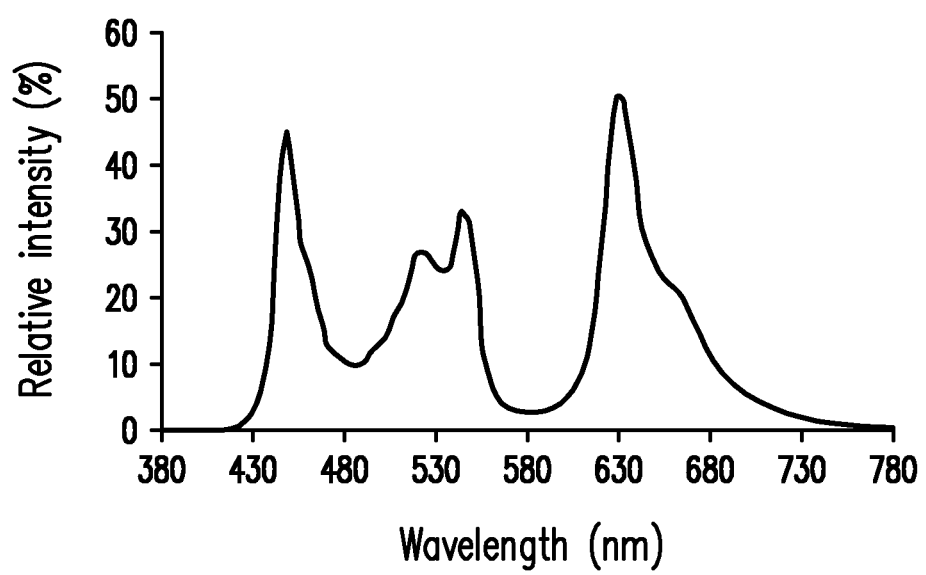
FIG. 6 is a spectrogram of a second light according to an embodiment of the disclosure.

FIG. 1 is a schematic cross-sectional view of a light source module according to an embodiment of the disclosure. FIG. 2 is a schematic cross-sectional view of a light-emitting element in a display device in FIG. 1. FIG. 3 is a schematic cross-sectional view of a filter in the display device in FIG. 1. FIG. 4 is a reflection spectrogram of the filter according to an embodiment of the disclosure. FIG. 5 is a spectrogram of a first light according to an embodiment of the disclosure. FIG. 6 is a spectrogram of a second light according to an embodiment of the disclosure.

With reference to FIG. 1, a light source module 100 includes a light-emitting element 110, a filter 120, and a light-guiding plate 130. The light-emitting element 110 includes a light-emitting surface 110a, the light-guiding plate 130 includes a light-incident surface 130a, and the light-incident surface 130a of the light-guiding plate 130 is disposed such that it faces the light-emitting surface 110a of the light-emitting element 110. The filter 120 is disposed between the light-emitting surface 110a and the light-incident surface 130a, and a center wavelength of a reflection band of the filter 120 falls in a range of 570 nm to 590 nm. The light-emitting element 110 emits a first light L1 having a first color temperature from the light-emitting surface 110a. The first light L1 is filtered into a second light L2 having a second color temperature after it passes through the filter 120. The light-incident surface 130a of the light-guiding plate 130 receives the second light L2. The first color temperature is lower than the second color temperature. In FIG. 1, the light source module 100 may be further covered by a cover plate (not labeled), and the light-emitting element 110, the filter 120, and the light-guiding plate 130 may be attached to the cover plate (not labeled) through an adhesive material (not labeled), but are not limited thereto. In other embodiments, the light-emitting element 110, the filter 120, and the light-guiding plate 13 of the light source module 100 may be assembled by positioning relative to each other through other mechanisms.

The light-incident surface 130a of the light-guiding plate 130 may receive the second light L2 and guide the second light L2 to become a surface light source. A material of the light-guiding plate 130 may include glass, polycarbonate (PC), poly(methyl methacrylate) (PMMA), or other suitable organic or inorganic materials, but the disclosure is not limited thereto. The light-incident surface 130a of the light-guiding plate 130 is located on a side of the light-guiding plate 130, therefore the light source module 100 has a side light-incident design. The light-emitting element 110 may be a strip light and is disposed on the side of the light-guiding plate 130. In response to the side light incident design and the design of the strip light, the filter 120 may be a strip-shaped optical film disposed along the light-incident surface 130a.

With reference to FIG. 2, in some embodiments, the light-emitting element 110 may be composed of a packaged light-emitting diode 111 and a circuit board 119 that carries the light-emitting diode. In addition, for example, the packaged light-emitting diode 111 may include a light-emitting diode chip 112 and a fluorescent structure 114. The light-emitting diode chip 112 is, for example, a blue light-emitting diode, but the disclosure is not limited thereto. The fluorescent structure 114 may include a matrix and silicate or yellow phosphor (such as YAG) doped in the matrix, but the disclosure is not limited thereto. In FIG. 2, the fluorescent structure 114 may surround a periphery and a top surface of the light-emitting diode chip 112, but in other embodiments, the fluorescent structure 114 may only be disposed on the top surface of the light-emitting diode chip 112. A ray emitted by the light-emitting diode chip 112 includes a first portion directly emitted from the light-emitting surface 110a and a second portion emitted from the light-emitting surface 110a after being converted by the fluorescent structure 114. In some embodiments, a wavelength of the second portion may be longer than a wavelength of the first portion. In addition, light of the first portion and light of the second portion jointly form the first light L1 having the first color temperature. Taking the fluorescent structure 114 inclusive of silicate or yellow phosphor (such as YAG) as an example, a range of the first color temperature may fall between 2500 K and 3800 K, or be lower than 6000 K.

With reference to FIG. 3, the filter 120 may include a base 122 and a stacked structure 124 disposed on the base 122. The base 122 may be a light-transmitting material, such as polycarbonate (PC), poly(methyl methacrylate) (PMMA), or other suitable materials, but the disclosure is not limited thereto. The stacked structure 124 includes alternately stacked (N+1) first material layers 124a and N second material layers 124b, where N is a positive integer. Each of the second material layers 124b is sandwiched between two of the first material layers 124a. In other words, a second material layer 124b is sandwiched between two adjacent first material layers 124a. A material of the first material layer 124a is different from a material of the second material layer 124b. The first material layer 124a has a first refractive index, the second material layer 124b has a second refractive index, and the first refractive index is greater than the second refractive index. For example, the material of the first material layer 124a may include titanium dioxide, and the material of the second material layer 124b may include silicon dioxide, but the disclosure is not limited thereto. In other embodiments, the material of the first material layer 124a may be selected from silicon (Si), tantalum pentoxide ($Ta_2O_5$), titanium dioxide ($TiO_2$), titanium pentoxide (Ti$_3$O$_5$), or niobium pentoxide (Nb$_2$O$_5$), while the material of the second material layer 124b may be selected from silicon dioxide (SiO$_2$) or magnesium fluoride (MgF$_2$). With the design of the stacked structure 124, the center wavelength of the reflection band of the filter 120 may fall within the range of 570 nm to 590 nm, and a width range of the reflection band may fall within 20 nm to 120 nm.

FIG. 4 shows a penetration spectrogram of the stacked structure formed when the material of the first material layer 124a is titanium dioxide and the material of the second material layer 124b is silicon dioxide. In addition, FIG. 4 shows penetration spectra of two examples of the filter 120, and the two examples have the stacked structures 124 with different number of layers. As shown in FIG. 4, the center wavelength of the reflection band presented by the two examples of the filter 120 roughly falls within the range of 570 nm to 590 nm, and the width range of the reflection band falls within 20 nm to 120 nm. In addition, a reflection bandwidth of the filter 120 inclusive of the stacked structure 124 with N being 5 is narrower than a reflection bandwidth of the filter 120 inclusive of the stacked structure 124 with N being 3. It may be seen that, when the material properties of the first material layer 124a and the second material layer 124b are known, the width of the reflection band of the filter 120 is adjusted by adjusting the number of layers of the stacked structure 124.

In some embodiments, in order to achieve a required filtering effect, the smaller a difference between the first refractive index and the second refractive index, the greater the number of layers the stacked structure 124 requires. The number of layers of the stacked structure 124 refers to a sum of the number (N+1) of the first material layer 124a and the number (N) of the second material layer 124b, that is, 2N+1. For example, a ratio ($\Delta$n/(2N+1)) of the difference ($\Delta$n) between the first refractive index and the second refractive index to the number of layers (2N+1) of the stacked structure 124 may be between 0.049 and 0.277. In some embodiments, N is at least 3, and preferably, N may be 3, 5, or 7, or other odd numbers.

In some embodiments, a thickness of each of the first material layers 124a is $3(\lambda_0/4n_1)$ or $5(\lambda_0/4n_1)$, and a thickness of each of the second material layers 124b is $3(\lambda_0/4n_2)$ or $5(\lambda_0/4n_2)$, where $\lambda_0$ is the center wavelength of the reflection band of the filter 120, $n_1$ is the first refractive index, and $n_2$ is the second refractive index. When the materials of the first material layer 124a and the second material layer 124b are known, the filter 120 may adjust the center wavelength of the reflection band of the filter 120 by adjusting the thickness of the first material layer 124a and/or the thickness of the second material layer 124b. For example, a required thickness of the first material layer 124a, and/or a required thickness of the second material layer 124b, and the total number of layers required by the stacked structure 124 may be estimated according to Bragg's law.

In the embodiment, the first light L1 may be filtered by the filter 120 into the second light L2. The first light L1 is emitted from the light-emitting surface 110a of the light-emitting element 110, its light color is yellowish and has a relatively low color temperature, for example, between 2500 K and 3800 K (that is, the first color temperature), and its spectrogram is shown in FIG. 5. Since the filter 120 may filter out light with a wavelength in a vicinity of 570 nm to 590 nm, it may filter the first light L1 into the second light L2, and the spectrogram of the second light L2 is shown in FIG. 6. Compared with the first light L1, the second light L2 is white light having a higher color temperature, and its color temperature (that is, the second color temperature) is, for example, between 6000 K and 7000 K and may reach about 82% of NTSC color gamut area. When the second light L2 is used in display applications, the picture may have good color saturation.

Figure 7:
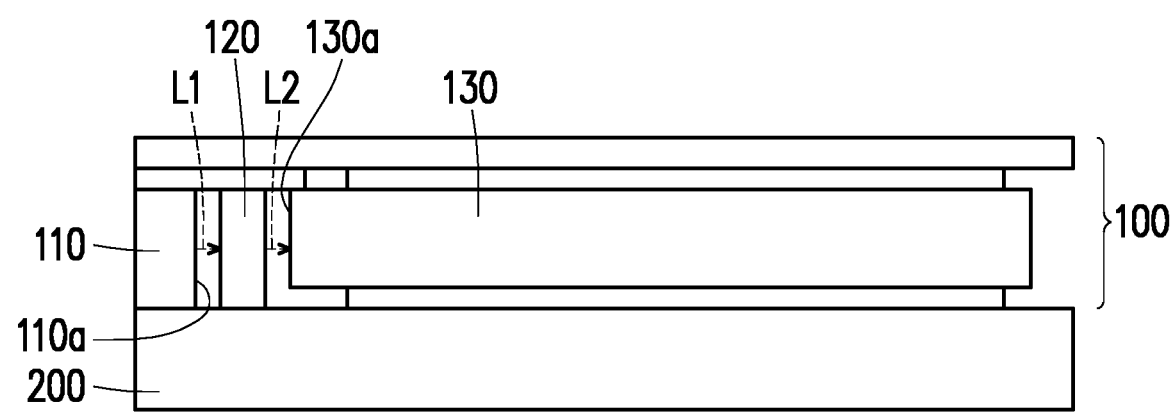
FIG. 7 is a schematic cross-sectional view of a display device according to an embodiment of the disclosure.

FIG. 7 is a schematic cross-sectional view of a display device according to an embodiment of the disclosure. A display device 10 in FIG. 7 includes the light source module 100 and a display module 200. The display module 200 is located under the light-guiding plate 130 of the light source module 100. For example, the display module 200 may be bonded to the light-guiding plate 130 through an adhesive material to form the display device 10, but the disclosure is not limited thereto.

In an exemplary application, the display device 10 may be a reflective display device, the light source module 100 of the display device 10 may be a front light source module, and the display module 200 may be a reflective display module, but the disclosure is not limited thereto. In other words, when a user views a screen presented by the display device 10, the light source module 100 is between the display module 200 and the user. The light source module 100 may include the light-emitting element 110, the filter 120, and the light-guiding plate 130. The light-emitting element 110 includes the light-emitting surface 110a, the light-guiding plate 130 includes the light-incident surface 130a, and the light-incident surface 130a of the light-guiding plate 130 is disposed such that it faces the light-emitting surface 110a of the light-emitting element 110. The filter 120 is disposed between the light-emitting surface 110a and the light-incident surface 130a, and the center wavelength of the reflection band of the filter 120 falls in the range of 570 nm to 590 nm. The light-emitting element 110 emits the first light L1 having the first color temperature from the light-emitting surface 110a. The first light L1 is filtered into the second light L2 having the second color temperature after it passes through the filter 120. The light-incident surface 130a of the light-guiding plate 130 receives the second light L2. The first color temperature is lower than the second color temperature. The display module 200 reflects the second light L2 from the light-guiding plate 130 into an image for viewing by the user. Based on the disposition of the light source module 100, it may achieve a wider NTSC color gamut area. Therefore, the image reflected by the display module 200 through the light source module 100 may have better color saturation.

In summary, the light source module of the disclosure includes the filter disposed between the light-emitting surface and the light-incident surface, and the center wavelength of the reflection band of the filter falls in the range of 570 nm to 590 nm, which may enable the first light having the lower color temperature to be filtered into the second light having the higher color temperature by the filter, thereby obtaining a wider NTSC color gamut, and improving the color saturation of the display device.

Although the disclosure has been described with reference to the above-mentioned embodiments, they are not intended to limit the disclosure. It is apparent that any one of ordinary skill in the art may make changes and modifications to the described embodiments without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. A light source module, comprising:
    a light-emitting element, comprising a light-emitting surface;
    a light-guiding plate, comprising a light-incident surface, wherein the light-guiding plate is disposed such that the light-incident surface faces the light-emitting surface; and
    a filter, disposed between the light-emitting surface and the light-incident surface, and a center wavelength of a reflection band of the filter falls in a range of 570 nm to 590 nm,
    wherein the light-emitting element emits a first light having a first color temperature from the light-emitting surface, the first light is filtered into a second light having a second color temperature after the first light passed through the filter, the light-incident surface of the guiding plate receives the second light, and the first color temperature is lower than the second color temperature,
    wherein the first color temperature is between 2500 K and 3800 K and
    wherein the second color temperature is between 6000 K and 7000 K.

2. The light source module according to claim 1, wherein the filter comprises a base and a stacked structure disposed on the base, and the stacked structure comprises alternately stacked (N+1) first material layers and N second material layers, where N is a positive integer,
    each of the second material layers is sandwiched between two of the first material layers, and
    the first material layer has a first refractive index, the second material layer has a second refractive index, and the first refractive index is greater than the second refractive index.

3. The light source module according to claim 2, wherein a ratio of a difference between the first refractive index and the second refractive index to a number of layers of the stacked structure is between 0.049 and 0.277.

4. The light source module according to claim 2, wherein a material of the first material layer comprises titanium dioxide, and a material of the second material layer comprises silicon dioxide.

5. The light source module according to claim 2, wherein N is at least 3.

6. The light source module according to claim 2, wherein a thickness of each of the first material layers is $3(\lambda_0/4n_1)$ or $5(\lambda_0/4n_1)$, and a thickness of the each of the second material layers is $3(\lambda/4n_2)$ or $5(\lambda_0/4n_2)$, where $\lambda_0$ is the center wavelength of the reflection band of the filter, $n_1$ is the first refractive index, and $n_2$ is the second refractive index.

7. The light source module according to claim 1, wherein a width range of the reflection band is from 20 nm to 120 nm.

8. The light source module according to claim 1, wherein the light-emitting element comprises silicate or yellow phosphor.

9. A display device, comprising:
    a light source module, comprising:
        a light-emitting element, comprising a light-emitting surface;
        a light-guiding plate, comprising a light-incident surface, wherein the light-guiding plate is disposed such that the light-incident surface faces the light-emitting surface; and
        a filter, disposed between the light-emitting surface and the light-incident surface, and a center wavelength of a reflection band of the filter falls in a range of 570 nm to 590 nm,
        wherein the light-emitting element emits a first light having a first color temperature from the light-emitting surface, the first light is filtered into a second light having a second color temperature after the first light passed through the filter, the light-incident surface of the guiding plate receives the second light, and the first color temperature is lower than the second color temperature, wherein the first color temperature is between 2500 K and 3800 K and
    wherein the second color temperature is between 6000 K and 7000 K; and
    a display module, located under the light-guiding plate of the light source module.

10. The display device according to claim 9, wherein the display module is a reflective display module.

11. The display device according to claim 9, wherein the light source module is a former light source module.

12. The display device according to claim 9, wherein the display module is bonded to the light-guiding plate of the light source module through an adhesive material.

* * * * *